United States Patent
Tamazawa et al.

(10) Patent No.: US 6,174,963 B1
(45) Date of Patent: Jan. 16, 2001

(54) METHOD FOR PRODUCING AMPHOTERIC RESIN HAVING DISPERSING FUNCTION

(75) Inventors: Mitsuo Tamazawa, Matsudo; Yasuo Kuroda, Tokyo, both of (JP)

(73) Assignee: Taisei Chemical Industries, Ltd., Tokyo (JP)

( * ) Notice: Under 35 U.S.C. 154(b), the term of this patent shall be extended for 0 days.

(21) Appl. No.: 09/353,610

(22) Filed: Jul. 14, 1999

(30) Foreign Application Priority Data

Jul. 15, 1998 (JP) ................................................. 10-200544

(51) Int. Cl.$^7$ ....................................................... C09C 3/10
(52) U.S. Cl. ............................ 525/193; 525/242; 525/267; 526/75; 526/213; 526/218.1; 526/303.1; 526/306; 526/307; 526/307.6; 526/317.1; 526/911; 526/932
(58) Field of Search .......................... 526/75, 213, 218.1, 526/303.1, 306, 307, 307.6, 317.1, 911, 932; 525/242, 267, 193

(56) References Cited

U.S. PATENT DOCUMENTS

| 4,659,781 | 4/1987 | Okude et al. . | |
|---|---|---|---|
| 5,134,187 | * 7/1992 | Aihara ................................. | 524/555 |
| 5,554,682 | 9/1996 | Harris et al. . | |
| 5,708,095 | 1/1998 | Grezzo Page et al. . | |
| 5,753,759 | 5/1998 | Hartmann et al. . | |

FOREIGN PATENT DOCUMENTS

| 0248574 | 12/1987 | (EP) . |
|---|---|---|
| 5-49715 | 6/1985 | (JP) . |
| 06207142 | 7/1994 | (JP) . |
| 95/32228 | 11/1995 | (WO) . |
| 95/32229 | 11/1995 | (WO) . |

* cited by examiner

*Primary Examiner*—Jeffrey Mullis
(74) *Attorney, Agent, or Firm*—Pillsbury Madison & Sutro LLP

(57) ABSTRACT

Provided is a method for producing an amphoteric resin which comprises reacting (1) a copolymerizable basic prepolymer $A_2$ which is obtained by reacting a prepolymer $A_1$ being obtained by polymerization of an amino group-containing $\alpha$, $\beta$-ethylenically polymerizable compound, other $\alpha$, $\beta$-ethylenically polymerizable compound and a polymerization initiator containing a carboxyl group at an end, with a compound having an epoxy group represented by the following formula (I):

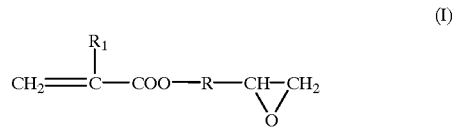

(I)

(wherein $R^1$ represents H or a methyl group, and R represents a straight or branched chain alkyl group of 1–10 carbon atoms) in an amount of 0.1–1.0 equivalent for the amino group equivalent of the prepolymer $A_1$ and (2) an $\alpha$, $\beta$-ethylenically polymerizable acidic prepolymer $B_2$ which is obtained by carrying out the reaction in the same manner as above with (3) other $\alpha$, $\beta$-ethylenically polymerizable compound C. The resulting resin has superior dispersibility for functional compounds such as various pigments and the resin in which the functional compounds have been dispersed is improved in weather resistance.

7 Claims, No Drawings

METHOD FOR PRODUCING AMPHOTERIC RESIN HAVING DISPERSING FUNCTION

BACKGROUND OF THE INVENTION

The present invention relates to a method for producing an amphoteric resin (copolymer) having function as a dispersant which is used for dispersing a functional compound. More particularly, it relates to a method for producing an amphoteric resin having function as a dispersant or a binder for functional compounds which resin is excellent in dispersibility for functional compounds such as pigments and excellent in wettability with the functional compounds, and consequently provides satisfactory weather resistance for the resin after dispersion (dispersion system).

Familiar functional compounds are pigments used for paints and inks, and these are generally used in combination rather than being used each alone. As well known, when these functional compounds are used in combination, since they differ in surface chemical characteristics, resins are demanded which have excellent function as a dispersant such that dispersibility for the functional compounds is not different so much even in any combination of the compounds differing in surface characteristics. Especially, at present, paints and inks are required to have weather resistance and endurance, and hence it is strongly demanded that wettability of functional compounds concerning these properties with binders, namely, dispersibility of the compounds in binders is satisfactory.

Conventionally, for giving good dispersibility to various pigments, it is proposed to use as a resin for dispersion of pigment a graft copolymer which comprises an acrylic resin in which is incorporated a basic prepolymer comprising an amino group-containing polymerizable compound such as dimethylaminoethyl methacrylate. (See, for example, JP-B-Hei 5 (1993)-49715, JP-Appln. No. Sho 58 (1983)-91930, and JP-A-Sho 59 (1984)-217769).

However, although the conventionally proposed acrylic copolymers grafted with basic prepolymer are superior in dispersibility for acidic pigments, they are inferior in dispersibility for basic pigments to cause sometimes a phenomenon of pigment separation as floating or flooding or pigment agglomeration. Moreover, since the basic prepolymers comprise amines such as dimethylaminoethyl methacrylate, if they are used in a large amount, the coat is yellowed and damaged in weather resistance. Thus, it is difficult to obtain a resin system having desirable dispersing function.

On the other hand, it is proposed for obtaining resins superior in weather resistance to use cyclohexyl methacrylate as a monomer (See, for example, JP-A-Hei 6 (1994)-207142). However, though resins prepared using cyclohexyl methacrylate are superior in weather resistance, the phenomenon such as pigment separation as floating or flooding or pigment agglomeration caused by the inferior pigment dispersibility cannot be avoided. Thus, for satisfying both the dispersibility for the functional compounds and the weather resistance for the resin after dispersion, it can be considered to use the above-mentioned resins of both types. However, sufficient effect cannot still be obtained even with using the resins in combination.

SUMMARY OF THE INVENTION

The object of the present invention is to provide resins which are effective for improving simultaneously dispersibility for the functional compounds, endurance and weather resistance of the resulting resins and especially which can disperse indiscriminately any of acidic and basic functional compounds irrespective of using each alone or in combination.

As a result of intensive research conducted by the inventors in an attempt to develop resins having characteristics to improve both the dispersibility and the weather resistance, they have succeeded in obtaining a novel amphoteric resin by graft copolymerizing a basic prepolymer and an acidic prepolymer on the main chain of a polymer. Thus, the present invention has been accomplished.

The present invention is a method for producing an amphoteric resin having dispersing function which comprises polymerizing the following prepolymer $A_2$, prepolymer $B_2$ and component C as essential components to graft copolymerize the prepolymer $A_2$ and the prepolymer $B_2$ on the main chain of the polymer of the component C so that amount of $A_2$ is in the range of 0.1–85% by weight, that of $B_2$ is in the range of 0.1–85% by weight, and that of C is in the range of 0.1–96% by weight with the total amount of $A_2$, $B_2$ and C being 100% by weight:

prepolymer $A_2$ which is copolymerizable and has a copolymerizable double bond and an amino group and an acid group together and which is obtained by reacting a prepolymer $A_1$ having a weight-average molecular weight of 1000–30000 and being obtained by polymerization of a polymerization initiator having a carboxyl group at an end, an amino group-containing α, β-ethylenically polymerizable compound and other α, β-ethylenically polymerizable compound, with a compound having an epoxy group represented by the following formula (I):

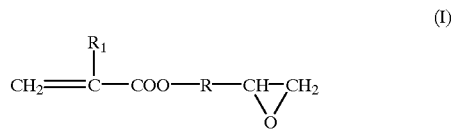

(wherein $R^1$ represents H or a methyl group, and R represents a straight or branched chain alkyl group of 1–10 carbon atoms) in an amount of 0.1–1.0 equivalent for amino group equivalent of the prepolymer $A_1$;

prepolymer $B_2$ which is copolymerizable and is obtained by reacting a prepolymer $B_1$ having a weight-average molecular weight of 1000–30000 and being obtained by polymerization of a polymerization initiator, a carboxyl group-containing α, β-ethylenically polymerizable compound and other α, β-ethylenically polymerizable compound, with a compound having an epoxy group represented by the above formula (I) in an amount of 0.1–1.0 equivalent for carboxyl group equivalent of the prepolymer $B_1$; and component C which is α, β-ethylenically copolymerizable with $A_2$ and $B_2$.

DETAILED DESCRIPTION OF THE INVENTION

The embodiments of the present invention will be explained in more detail.

In the present invention, the prepolymer $A_1$ is a prepolymer having a weight-average molecular weight of 1000–30000 which is obtained by the solution polymerization of an amino group-containing α, β-ethylenically polymerizable compound and other polymerizable compound using a polymerization initiator containing a carboxyl group at an end by a conventional polymerization method at a temperature of 80–180° C. in a nitrogen stream.

The polymerization initiators having a carboxyl group at an end used in the present invention include, for example, 4,4'-azobis-4-cyanovaleric acid.

The amino group-containing α, β-ethylenically polymerizable compounds used in the present invention include, for example, acrylates such as dimethylaminomethyl acrylate, diethylaminomethyl acrylate, dibutylaminomethyl acrylate, dihexylaminomethyl acrylate, dimethylaminoethyl acrylate, diethylaminoethyl acrylate, di(t-butyl)aminoethyl acrylate, diisohexylaminoethyl acrylate, dihexylaminopropyl acrylate, and di(t-butyl)aminohexyl acrylate, and methacrylates corresponding to these acrylates. These may be used each alone or in combination. It is necessary that amount of the amino group-containing polymerizable compound is at least 30% by weight of the components of the prepolymer $A_1$. If it is less than 30% by weight, the resulting resin (copolymer) cannot completely or sufficiently disperse an acidic pigment.

The other α, β-ethylenically polymerizable compounds used in the present invention include, for example, (1) monomers, e.g., alkyl or cycloalkyl esters of acrylic acid or methacrylic acid, such as methyl acrylate, methyl methacrylate, ethyl acrylate, ethyl methacrylate, n-butyl acrylate, n-butyl methacrylate, i-butyl acrylate, i-butyl methacrylate, t-butyl acrylate, t-butyl methacrylate, cyclohexyl acrylate, cyclohexyl methacrylate, 2-ethylhexyl acrylate, 2-ethylhexyl methacrylate, lauryl acrylate, and lauryl methacrylate, (2) vinyl monomers such as styrene, vinyltoluene, α-methylstyrene, vinyl acetate, acrylonitrile, and methacrylonitrile, and (3) monomers, e.g., hydroxyalkyl esters of acrylic acid or methacrylic acid, such as 2-hydroxyethyl acrylate, 2-hydroxyethyl methacrylate, hydroxypropyl acrylate, and hydroxypropyl methacrylate. These may be used each alone or in combination.

Solvents usable, for example, in the solution polymerization include aromatic solvents such as toluene and xylene, ketones such as acetone, methyl ethyl ketone, and methyl isobutyl ketone, alcohols such as n-butanol, i-butanol, and isopropyl alcohol, and esters such as ethyl acetate and n-butyl acetate. These may be used each alone or in combination. Among them, preferred are alcohols and ketones which are high in dissolvability for the amino group-containing polymerizable compounds.

Molecular weight of the prepolymer $A_1$ can be optionally selected within the range of 1000–30000 in weight-average molecular weight, and is preferably 1500–10000. If the molecular weight is less than 1000, dispersibility for acidic pigments is not sufficient, and if it is more than 30000, stability of paints is deteriorated depending on the kind of pigments.

The reactive prepolymer $A_2$ in the present invention is an α, β-ethylenically copolymerizable reactive prepolymer having a copolymerizable double bond and an amino group and an acid group together which is obtained by addition reaction of the prepolymer $A_1$ with a compound having an epoxy group represented by the following formula (I):

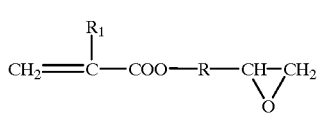

(I)

(wherein $R^1$ represents H or a methyl group, and R represents a straight or branched chain alkyl group of 1–10 carbon atoms) in an amount of 0.1–1.0 equivalent for amino group equivalent of the prepolymer $A_1$ in the presence of a polymerization inhibitor and a tertiary amino compound at 80–200° C. in a mixed gas stream, for example, comprising 93% of nitrogen and 7% of oxygen.

The epoxy group-containing α, β-ethylenically polymerizable compounds in the present invention include glycidyl acrylate, glycidyl methacrylate and the like represented by the formula (I). These may be used each alone or in combination. These compounds can be subjected to addition reaction with the prepolymer $A_1$ in an amount of 0.1–1.0 equivalent for the amino group equivalent of the prepolymer $A_1$, whereby a polymerizable double bond can be introduced. However, if the equivalent amount of these compounds exceeds 0.5 for the amino group equivalent, gelation sometimes occurs at the copolymerization reaction of the reactive prepolymer $A_2$, the reactive prepolymer $B_2$, and the other α, β-ethylenically polymerizable compound, and thus 0.1–0.5 equivalent for the amino group equivalent is preferred.

The prepolymer $B_1$ used in the present invention is a prepolymer having a weight-average molecular weight of 1000–30000 which is obtained by the solution polymerization of a carboxyl group-containing α, β-ethylenically polymerizable compound and other polymerizable compound using a polymerization initiator (a polymerization initiator having a carboxyl group at an end and/or a usual polymerization initiator) by a conventional polymerization method at a temperature of 80–180° C. in a nitrogen stream.

As the polymerization initiators having a carboxyl group used in preparation of the prepolymer $B_1$, there may be used the same polymerization initiators as used for the preparation of the prepolymer $A_1$, and as the usual polymerization initiators, mention may be made of, for example, azo polymerization initiators such as azobisisobutyronitrile and peroxide polymerization initiators such as benzoyl peroxide. These may be used each alone or in combination.

The carboxyl group-containing α, β-ethylenically polymerizable compounds used in the present invention include, for example, acids such as acrylic acid, methacrylic acid, maleic acid, itaconic acid, 2-acryloyloxyethylsuccinic acid, and 2-acryloyloxyethylphthalic acid. These may be used each alone or in combination. It is necessary that amount of the carboxyl group-containing α, β-ethylenically polymerizable compounds is at least 30% by weight of the components of the prepolymer $B_1$. If it is less than 30% by weight, the resulting resin can have no or insufficient dispersibility for basic pigments. As the other polymerizable compounds in the present invention, there may be used the same compounds as used for the preparation of the prepolymer $A_1$ each alone or in combination.

The prepolymer $B_1$ used in the present invention is a prepolymer having a weight-average molecular weight of 1000–30000 which is obtained by the polymerization of the above components by a conventional polymerization method.

As the solvents usable in the solution polymerization, there may be used the same solvents as used for the preparation of the prepolymer $A_1$ each alone or in combination. Among them, preferred are alcohols and ketones which are good in dissolvability for the carboxyl group-containing polymerizable compounds.

Molecular weight of the prepolymer $B_1$ can be optionally selected within the range of 1000–30000 in weight-average molecular weight, and is preferably 1500–10000. If the molecular weight is less than 1000, dispersibility for basic pigments is not sufficient, and if it is more than 30000, stability of paints is deteriorated depending on the kind of pigments used.

The reactive prepolymer $B_2$ in the present invention is a copolymerizable reactive prepolymer having a copolymerizable double bond and an acid group together which is obtained by addition reaction of the prepolymer $B_1$ with a compound having an epoxy group represented by the formula (I) in an amount of 0.1–1.0 equivalent for carboxyl group equivalent of the prepolymer $B_1$ in the presence of a polymerization inhibitor and a tertiary amino compound at 80–200° C. in a mixed gas stream, for example, comprising 93% of nitrogen and 7% of oxygen.

The epoxy group-containing $\alpha$, $\beta$-ethylenically polymerizable compounds can be subjected to addition reaction in an amount of 0.1–1.0 equivalent for the carboxyl group equivalent, whereby a polymerizable double bond can be introduced. However, if the equivalent amount of these compounds exceeds 0.5 for the carboxyl group equivalent, gelation sometimes occurs at the copolymerization reaction of the reactive prepolymer $A_2$, the reactive prepolymer $B_2$, and the other $\alpha$, $\beta$-ethylenically polymerizable compound, and thus 0.1–0.5 equivalent for the carboxyl group equivalent is preferred.

The amphoteric resin obtained by the present invention comprises the copolymerizable prepolymers $A_2$ and $B_2$ and a component C which is $\alpha$, $\beta$-ethylenically copolymerizable with the prepolymers $A_2$ and $B_2$ as essential components. As the component C, in addition to the other $\alpha$, $\beta$-ethylenically polymerizable compounds in the preparation of the prepolymers $A_1$ and $B_1$, there may be used (4) $\alpha$, $\beta$-ethylenically unsaturated carboxylic acids such as acrylic acid, methacrylic acid, itaconic acid, and maleic acid and (5) acrylamides and methacrylamides such as acrylamide, methacrylamide and N-methylacrylamide each alone or in combination. In the present invention, the amphoteric resin (copolymer) can be obtained by carrying out a conventional solution polymerization using a conventional polymerization initiator at 80–180° C. in a nitrogen stream to graft copolymerize the prepolymers $A_2$ and $B_2$ on the main chain of the polymer of the component C.

In the present invention, amount of the prepolymer $A_2$ which is a constituent of the amphoteric resin can be optionally selected within the range of 0.5–20% by weight of the constituents of the amphoteric resin. If the amount of the prepolymer $A_2$ is less than 0.5% by weight of the constituents, the resin has no or insufficient dispersibility for acidic pigments, and if it is more than 20% by weight, the resin is markedly deteriorated in weather resistance and stability of paints becomes inferior depending on the kind of pigments to be dispersed. The amount is preferably 1.0–10% by weight.

Amount of the prepolymer $B_2$ which is a constituent of the amphoteric resin can be optionally selected within the range of 0.5–30% by weight of the constituents of the amphoteric resin. If the amount of the prepolymer $B_2$ is less than 0.5% by weight of the constituents, the resin has no or insufficient dispersibility for basic pigments, and if it is more than 30% by weight, stability of paints is sometimes deteriorated depending on the kind of pigments. The amount is preferably 1.0–15% by weight.

The amphoteric resins (copolymers) obtained by the present invention are satisfactory in dispersibility for acidic pigments because thy have a basic prepolymer on the graft chain, and further they are also satisfactory in dispersibility for basic pigments because they have an acidic prepolymer on the graft chain. By using components $A_2$ and $B_2$ in combination and introducing a small amount of a basic prepolymer into the copolymer, dispersibility for various pigments differing in polarity is improved, and as a result, deterioration of the weather resistance of the resins caused by amine group can be inhibited and weather resistance can be remarkably improved. Thus, the resins are very useful.

When the amphoteric resins (copolymers) having dispersion function obtained by the present invention are used as dispersion resins, dispersibility for functional compounds such as pigments is improved, and, furthermore, wettability with the functional compounds is improved and as a result the resins after the compounds are dispersed exhibit excellent weather resistance. Thus, the amphoteric resins obtained by the present invention have a function as dispersant or binder for the functional compounds and can be used for various uses such as paints and inks. Since the amphoteric resins (copolymers) obtained by the present invention are excellent in dispersibility for functional compounds, particularly, pigments, they are suitable as resins for dispersion of pigments, and, besides, since they have the copolymer component C, they are excellent in weather resistance and can also be used for top coating over various paints.

DESCRIPTION OF PREFERRED EMBODIMENTS

The present invention will be explained by the following examples.

EXAMPLE 1

(Preparation of basic prepolymer $A_2$)

47 Parts of butyl acetate was charged in a flask equipped with a stirrer, a dropping funnel, a condenser tube, and a thermometer and heated to 120° C. in a nitrogen atmosphere. A mixture of the following compositions I and II was charged in the dropping funnel and added dropwise at an equal rate over a period of 3 hours.

| Composition I: | |
| --- | --- |
| 4,4'-Azobis-4-cyanovaleric acid | 4.3 parts |
| Triethylamine | 1.4 parts |
| Cellosolve acetate | 22.0 parts |
| Composition II: | |
| Dimethylaminoethyl methacrylate | 17.3 parts |
| Butyl acetate | 5.0 parts |

After lapse of 30 minutes from the completion of the addition, 0.01 part of hydroquinone was added, and then 3.6 parts of glycidyl methacrylate was added, followed by carrying out the reaction for further 2 hours to obtain the basic prepolymer $A_2$.

EXAMPLE 2

(Preparation of acidic prepolymer $B_2$)

35 Parts of butyl acetate was charged in a flask equipped with a stirrer, a dropping funnel, a condenser tube, and a thermometer and heated to 120° C. in a nitrogen atmosphere. The following composition was charged in the dropping funnel and added dropwise at an equal rate over a period of 3 hours.

| 2-Methacryloyloxyethylphthalic acid | 20.0 parts |
| --- | --- |
| Azobisisobutyronitrile | 4.0 parts |
| Butyl acetate | 10.0 parts |

After lapse of 30 minutes from the completion of the addition, 0.01 part of hydroquinone was added, and then 2.0 parts of glycidyl methacrylate and 0.6 part of triethylamine were added, followed by carrying out the reaction for further 2 hours to obtain the acidic prepolymer $B_2$.

EXAMPLE 3

(Preparation of amphoteric resin)

10 Parts of butyl acetate and 10 parts of cellosolve acetate were charged in a flask equipped with a stirrer, a dropping funnel, a condenser tube, and a thermometer and heated to 120° C. in a nitrogen atmosphere. The following prepolymer composition was charged in the dropping funnel and added dropwise at an equal rate over a period of 2 hours.

| | |
|---|---|
| Cyclohexyl methacrylate | 23 parts |
| Methyl methacryate | 5 parts |
| Butyl acrylate | 15 parts |
| 2-Hydroxyethyl methacrylate | 7 parts |
| Basic prepolymer $A_2$ obtained in Example 1 | 3 parts |
| Acidic prepolymer $B_2$ obtained in Example 2 | 3 parts |
| Acrylic acid | 0.3 part |
| Azobisisobutyronitrile | 1 part |

After lapse of 1 hour from the completion of the addition, a mixed solution of 0.2 part of azobisisobutyronitrile and 10 parts of toluene were added dropwise at an equal rate over a period of 2 hours. After kept at 120° C. for 1 hour from the completion of the addition, the reaction mixture was cooled and thereafter diluted with 9 parts of toluene, and an amphoteric resin (copolymer) was taken out as a varnish.

EXAMPLES 4–8

In the same manner as in Example 3, copolymer varnishes were obtained at the formulation as shown in the following Table 1.

TABLE 1

| Example | 4 | 5 | 6 | 7 | 8 |
|---|---|---|---|---|---|
| Basic prepolymer $A_2$ obtained in Example 1 | 3 | 1.2 | 0.5 | 6.0 | 4.8 |
| Acidic prepolymer $B_2$ obtained in Example 2 | 3 | 4.8 | 0.5 | 0 | 1.2 |
| Cyclohexyl methacrylate | 23 | 23 | 20 | 0 | 23 |
| Methyl methacrylate | 5 | 5 | 10 | 26 | 5 |
| Butyl acrylate | 15 | 15 | 10 | 14 | 15 |
| 2-Hydroxyethyl methacrylate | 7 | 7 | 10 | 10 | 7 |
| Acrylic acid | 0 | 0.3 | 0.3 | 0.3 | 0.3 |
| Dimethylaminoethyl methacrylate | 0.3 | 0 | 0 | 0 | 0 |
| Azobisisobutyronitrile | 1 | 1 | 1.5 | 1 | 1 |

COMPARATIVE EXAMPLES 1–5

In the same manner as in Example 3, copolymer varnishes were obtained at the formulation as shown in the following Table 2.

The properties of varnish described in the above Examples and Comparative Examples are shown in the following Table 3.

TABLE 2

| Comparative Example | 1 | 2 | 3 | 4 | 5 |
|---|---|---|---|---|---|
| Basic prepolymer $A_2$ obtained in Example 1 | 0 | 6 | 0 | 0 | 3 |
| Acidic prepolymer $B_2$ obtained in Example 2 | 0 | 0 | 6 | 0 | 0 |
| Cyclohexyl methacrylate | 23 | 23 | 23 | 0 | 23 |
| Methyl methacrylate | 5 | 5 | 5 | 26 | 5 |
| Butyl acrylate | 15 | 15 | 15 | 14 | 12 |
| 2-Hydroxylethyl methacrylate | 7 | 7 | 7 | 10 | 10 |
| Acrylic acid | 1.0 | 0 | 0.3 | 1.0 | 1.0 |
| Dimethylaminoethyl methacrylate | 1.5 | 0 | 0 | 0 | 0 |
| Azobisisobutyronitrile | 1 | 1 | 1 | 0.5 | 1 |

TABLE 3

| | Properties of varnish | | | | | |
|---|---|---|---|---|---|---|
| | Example 3 | Example 4 | Example 5 | Example 6 | Example 7 | Example 8 |
| Nonvolatile matter (%) | 50 | 50 | 51 | 50 | 50 | 51 |
| Viscosity (BM type)ps | 25.9 | 25.1 | 21.0 | 28.7 | 38.2 | 19.0 |
| Acid value | 3.3 | 1.6 | 3.6 | 3.0 | 3.1 | 3.3 |
| Hydroxyl value (solid) | 60 | 60 | 60 | 85 | 85 | 60 |
| Weight-average molecular weight | 30000 | 32000 | 30000 | 25000 | 31000 | 24000 |

| | Comparative Example 1 | Comparative Example 2 | Comparative Example 3 | Comparative Example 4 | Comparative Example 5 |
|---|---|---|---|---|---|
| Nonvolatile matter (%) | 50 | 51 | 50 | 50 | 50 |
| Viscosity (BM type)ps | 15.0 | 20.1 | 18.0 | 49.0 | 18.3 |
| Acid value | 7.9 | — | 3.0 | 7.2 | 7.0 |
| Hydroxyl value (solid) | 60 | 60 | 60 | 85 | 85 |
| Weight-average molecular weight | 33000 | 32000 | 32000 | 50000 | 32000 |

EXAMPLE 9

Using the varnishes obtained in Example 3, Examples 4–8 and Comparative Examples 1–5, pigment was dispersed at the following paint formulation by a paint shaker to obtain black and white paints.

| (Paint formulation): | |
|---|---|
| Mill base formulation: | |
| Carbon | 7.0 parts |
| Varnish | 32.0 parts |
| Toluene | 31.0 parts |
| | 70.0 parts |
| Titanium oxide | 40.0 parts |
| Varnish | 20.0 parts |
| Toluene | 15.0 parts |
| | 75.0 parts |
| Let down formulation | |
| Black mill base | 22.0 parts |
| Varnish | 66.0 parts |
| Toluene | 12.0 parts |
| | 100.0 parts |
| White mill base | 40.0 parts |
| Varnish | 54.0 parts |
| Toluene | 6.0 parts |
| | 100.0 parts |

90 Parts of the above white fundamental color and 10 parts of the black fundamental color were diluted with 10 parts of toluene, and applied to a glass plate at a film thickness of 100 microns by an applicator. Just before drying to the touch, the film was rubbed, and color difference between the rubbed portion and the unrubbed portion was measured. Furthermore, the white primary color pigment was coated on an urethane plate and subjected to weathering test by a carbon sunshine weather meter for 500 hours. Then, color difference between the film subjected to the test and the initial film was measured. The color difference ΔE was measured by Lab method in accordance with JIS Z8730-1995 using ND-504AA manufactured by Nihon Denshoku Co., Ltd. The results of evaluation are shown in Table 4.

The evaluation method about dispersibility of each pigment is measured by grind gage and the evaluation data are shown by the depth of channel in the page. And then the results of evaluation on the dispersibility are shown by the following grade.

| Depth of channel | Grade |
|---|---|
| Less than 5 micron | ⊙ |
| 5–10 | ○ |
| 10–20 | Δ |
| 20–30 | X |
| More than 30 micron | XX |

Results of evaluation on pigment separation as floating or flooding are shown by the following grade.

| ΔE | Grade |
|---|---|
| Less than 0.3 | ⊙ |
| 0.3–0.5 | ○ |
| 0.5–1.0 | Δ |
| 1.0–3.0 | X |
| More than 3.0 | XX |

Results of evaluation on weather resistance are shown by the following grade.

| ΔE | Grade |
|---|---|
| Less than 0.5 | ⊙ |
| 0.5–1.0 | ○ |
| 1.0–2.0 | Δ |
| 2.0–3.0 | X |
| More than 3.0 | XX |

The black pigments and the white pigments prepared using the varnish of Example 6 were both good in dispersibility and also good in pigment separation as floating or flooding and weather resistance.

What is claimed is:

1. A method for producing an amphoteric resin having dispersing function which comprises polymerizing the following prepolymer $A_2$, prepolymer $B_2$ and component C as essential components to graft copolymerize the prepolymer $A_2$ and the prepolymer $B_2$ on the main chain of the polymer of the component C so that amount of $A_2$ is in the range of 0.1–85% by weight, that of $B_2$ is in the range of 0.1–85% by

TABLE 4

Test results on paint

| | Example 3 | Example 4 | Example 5 | Example 6 | Example 7 | Example 8 |
|---|---|---|---|---|---|---|
| Dispersibility of black pigment | ⊙ | ⊙ | ○ | ⊙ | ⊙ | ⊙ |
| Dispersibility of white pigment | ⊙ | ⊙ | ⊙ | ⊙ | Δ | ○ |
| Weather resistance | ○ | ○ | ⊙ | ⊙ | X | X |
| Color segregation | ⊙ | ⊙ | ○ | ⊙ | Δ | ○ |

| | Comparative Example 1 | Comparative Example 2 | Comparative Example 3 | Comparative Example 4 | Comparative Example 5 |
|---|---|---|---|---|---|
| Dispersibility of black pigment | XX | ⊙ | ○ | X | ○ |
| Dispersibility of white pigment | X | Δ | ⊙ | Δ | Δ |
| Weather resistance | ⊙ | XX | ○ | Δ | Δ |
| Color segregation | XX | ○ | ○ | X | ○ | weight, and that of C is in the range of 0.1–96% by weight with the total amount of $A_2$, $B_2$ and C being 100% by weight:

prepolymer $A_2$ which is copolymerizable and has a copolymerizable double bond and amino group and acid group together and which is obtained by reacting a prepolymer $A_1$ having a weight-average molecular weight of 1000–30000 and being obtained by polymerization of an amino group-containing α, β-ethylenically polymerizable compound, other α, β-ethylenically polymerizable compound and a polymerization initiator containing a carboxyl group at an end, with a compound having an epoxy group represented by the following formula (I):

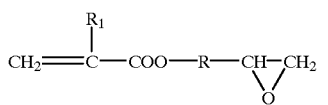
(I)

(wherein $R^1$ represents H or a methyl group, and R represents a straight or branched chain alkyl group of 1–10 carbon atoms) in an amount of 0.1–1.0 equivalent for the amino group equivalent of the prepolymer $A_1$;

prepolymer $B_2$ which is copolymerizable and is obtained by reacting a prepolymer $B_1$ having a weight-average molecular weight of 1000–30000 and being obtained by polymerization of a carboxyl group-containing α, β-ethylenically polymerizable compound, other α, β-ethylenically polymerizable compound and a polymerization initiator, with a compound having an epoxy group represented by the above formula (I) in an amount of 0.1–1.0 equivalent for the carboxyl group equivalent of the prepolymer $B_1$; and component C which is α, β-ethylenically copolymerizable with $A_2$ and $B_2$.

2. A method according to claim 1, wherein the component C contains one or more monomers containing at least an amino group.

3. A method according to claim 1, wherein the component C contains one or more monomers containing at least a carboxyl group.

4. A method according to claim 1, wherein the resin contains $A_2$ and $B_2$ in an amount of at least 2%, respectively.

5. An amphoteric resin having dispersing function which is obtained by the method of claim 1.

6. An article coated with the amphoteric resin having dispersing function which is obtained by the method of claim 1.

7. An article according to claim 6, wherein a pigment is dispersed in the amphoteric resin.

* * * * *